United States Patent
Yang et al.

(10) Patent No.: US 9,053,719 B2
(45) Date of Patent: Jun. 9, 2015

(54) MAGNETORESISTIVE SENSOR FOR A MAGNETIC STORAGE SYSTEM READ HEAD, AND FABRICATION METHOD THEREOF

(71) Applicant: Western Digital (Fremont), LLC, Fremont, CA (US)

(72) Inventors: Cheng-Han Yang, Mountain View, CA (US); Chen-Jung Chien, Mountain View, CA (US); Christian Kaiser, San Jose, CA (US); Yuankai Zheng, Fremont, CA (US); Qunwen Leng, Palo Alto, CA (US); Mahendra Pakala, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 98 days.

(21) Appl. No.: 13/691,695

(22) Filed: Nov. 30, 2012

(65) Prior Publication Data
US 2014/0154529 A1    Jun. 5, 2014

(51) Int. Cl.
G11B 5/39 (2006.01)
B82Y 10/00 (2011.01)

(52) U.S. Cl.
CPC ............ G11B 5/3909 (2013.01); B82Y 10/00 (2013.01); G11B 2005/3996 (2013.01)

(58) Field of Classification Search
CPC ...... G11B 5/39; G11B 5/3906; G11B 5/3909; G11B 5/3912
USPC ........ 360/324; 428/811.3, 811; 427/128, 129, 427/130, 131, 132
See application file for complete search history.

(56) References Cited

U.S. PATENT DOCUMENTS

| | | | |
|---|---|---|---|
| 6,322,640 B1 | 11/2001 | Xiao et al. | |
| 6,621,667 B1 | 9/2003 | He et al. | |
| 6,735,060 B2 | 5/2004 | Gill | |
| 6,795,279 B2 | 9/2004 | Singleton et al. | |
| 6,819,532 B2 | 11/2004 | Kamijo | |
| 7,190,557 B2 | 3/2007 | Li et al. | |
| 7,476,919 B2 | 1/2009 | Hong et al. | |
| 7,488,609 B1 | 2/2009 | Lin et al. | |
| 8,169,821 B1 * | 5/2012 | Ranjan et al. | 365/171 |
| 8,630,069 B1 * | 1/2014 | Okawa et al. | 360/319 |
| 2006/0209590 A1 | 9/2006 | Guo et al. | |
| 2008/0080101 A1 | 4/2008 | Mauri et al. | |
| 2008/0179699 A1 | 7/2008 | Horng et al. | |
| 2008/0299679 A1 | 12/2008 | Zhao et al. | |
| 2009/0229111 A1 * | 9/2009 | Zhao et al. | 29/603.08 |
| 2010/0079918 A1 * | 4/2010 | Fuke et al. | 360/324 |

OTHER PUBLICATIONS

Chando Park et al (Journal of Applied Physics, vol. 99, 08A901-1 to 08A901-3, 2006).*
Ibusuki et al., "Lower Temperature Crystallization of CoFeB Magnetic Tunnel Junctions by Using Ti Capping Layer", IEEE Applied Physics Letters 94, 062509 (2009), (published online Feb. 11, 2009).

* cited by examiner

*Primary Examiner* — Michael Cleveland
*Assistant Examiner* — Tabassom Tadayyon Eslami

(57) ABSTRACT

A magnetic read transducer including a magnetoresistive sensor is described, as well as a fabrication method thereof. The magnetoresistive sensor includes a cap layer overlaying a free layer. The cap layer is situated with a first thickness to absorb boron from the free layer. The magnetoresistive sensor is annealed, and boron is diffused from the free layer and absorbed by the cap layer, improving the magnetic performance of the free layer. The cap layer thickness is then reduced to a second thickness, thereby reducing the shield-to-shield (SS) stack spacing of the magnetoresistive sensor and allowing for increased areal recording density.

12 Claims, 4 Drawing Sheets

MAGNETORESISTIVE SENSOR FOR A MAGNETIC STORAGE SYSTEM READ HEAD, AND FABRICATION METHOD THEREOF

FIELD

The invention relates generally to the field of magnetic recording systems. More specifically, embodiments of the present invention pertain to improving magnetic performance of a magnetoresistive sensor free layer of a magnetic storage system read head.

BACKGROUND

Magnetic storage systems, such as a hard disk drive, are utilized in a wide variety of devices in both stationary and mobile computing environments. Examples of devices that incorporate magnetic storage systems include desktop computers, portable notebook computers, portable hard disk drives, digital versatile disc (DVD) players, high definition television receivers, vehicle control systems, cellular or mobile telephones, television set top boxes, digital cameras, digital video cameras, video game consoles, and portable media players.

A typical hard disk drive includes magnetic storage media of one or more flat disks. The disks are generally formed of two main substances, namely, a substrate material that gives it structure and rigidity, and a magnetic media coating that holds the magnetic impulses or moments that represent data. A hard disk drive also typically includes a read head and a write head, generally a magnetic transducer which can sense and/or change the magnetic fields stored on the disks. Perpendicular magnetic recording (PMR) involves recorded bits that are stored in a generally planar recording layer in a generally perpendicular or out-of-plane orientation. A PMR read head and a PMR write head are usually formed as an integrated read/write head on an air-bearing slider. In a PMR reader, a tunnel magnetoresistance (TMR) sensor is frequently employed in the read head.

Hard disk drive performance demands and design needs have intensified. The current demand for larger capacity in a smaller dimension is linked to the demand for ever increasing storage track density. As the density of data on the magnetic storage medium increases, the strength of the magnetic fields generally decrease, in order to minimize interference. Higher areal density in magnetic storage medium requires advanced read/write transducer design.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

As the demand for increased areal density of the magnetic recording hard disk intensifies, the design demands of the read and write transducer intensifies. To provide high areal density, the gap width of the read transducer, known as shield-to-shield distance (SS), may be reduced. Increasing the signal-to-noise ratio (SNR) of the read transducer also allows for increased areal recording density. Increased SNR may be provided by a read transducer free layer with increased magnetic moment, decreased damping constant, and optimized magnetostriction.

An apparatus, system and method are described herein for improving the magnetic performance of a magnetoresistive sensor free layer of a magnetic storage system read head. Also described is a method to reduce shield-to-shield (SS) sensor stack spacing, while retaining the improved magnetic performance of the free layer. It will be apparent that the magnetoresistive sensors and methods disclosed within this discussion and claims may be utilized with disk drive memory systems, and other memory systems utilizing a reading and/or writing device.

Figure 1:
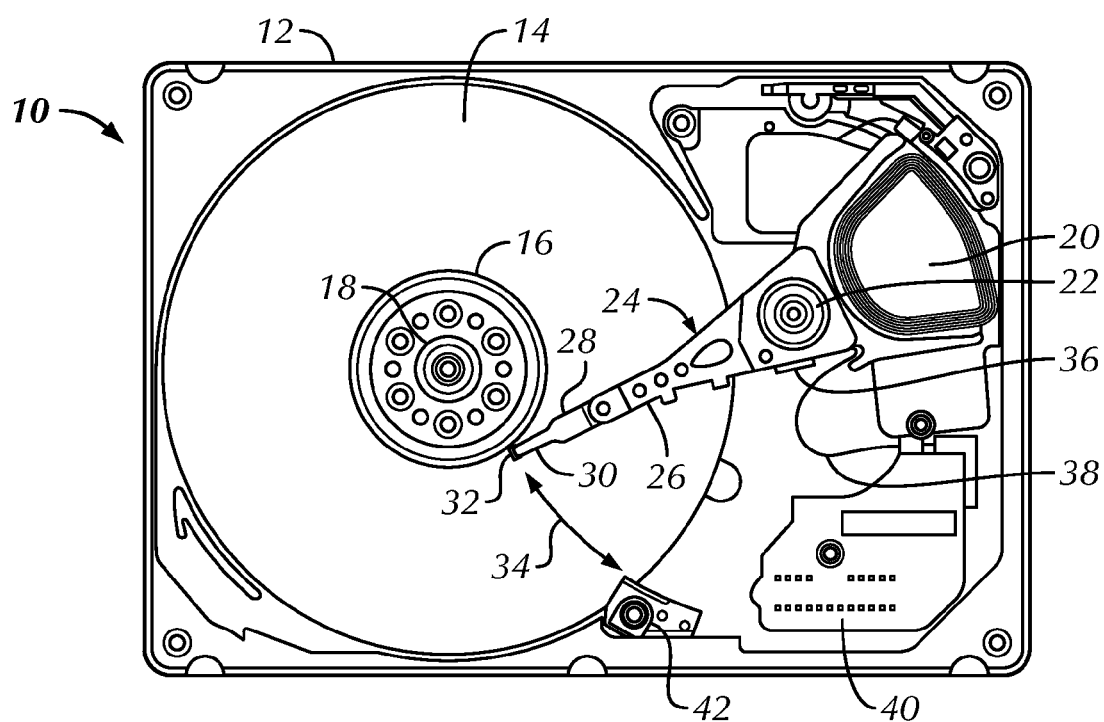
FIG. 1 is a top plan view of a disk drive data storage system in which embodiments of the present invention are useful.

Referring to the drawings wherein identical reference numerals denote the same elements throughout the various views, FIG. 1 illustrates a disk drive storage system 10, in which embodiments of the present invention are useful. Features of the discussion and claims are not limited to this particular design, which is shown only for purposes of the example. Disk drive 10 includes base plate 12 that may be disposed on a top cover forming a sealed environment to protect internal components from contamination.

Disk drive 10 further includes one or more data storage disks 14 of computer-readable data storage media. Typically, both of the major surfaces of each data storage disk 14 include a plurality of concentrically disposed tracks for data storage purposes. Each data storage disk 14 is mounted on a hub or spindle 16, which in turn is rotatably interconnected with a base plate 12 and/or cover. Multiple data storage disks 14 are typically mounted in vertically spaced and parallel relation on the spindle 16. A spindle motor 18 rotates the data storage disks 14 at an appropriate rate.

The disk drive 10 also includes an actuator arm assembly 24 that pivots about a pivot bearing 22, which in turn is rotatably supported by the base plate 12 and/or cover. The actuator arm assembly 24 includes one or more individual rigid actuator arms 26 that extend out from near the pivot bearing 22. Multiple actuator arms 26 are typically disposed in vertically spaced relation, with one actuator arm 26 being provided for each major data storage surface of each data storage disk 14 of the disk drive 10. Other types of actuator arm assembly configurations may be utilized as well, such as an assembly having one or more rigid actuator arm tips or the like that cantilever from a common structure. Movement of the actuator arm assembly 24 is provided by an actuator arm drive assembly, such as a voice coil motor 20 or the like. The voice coil motor 20 is a magnetic assembly that controls the operation of the actuator arm assembly 24 under the direction of control electronics 40.

Figure 2:
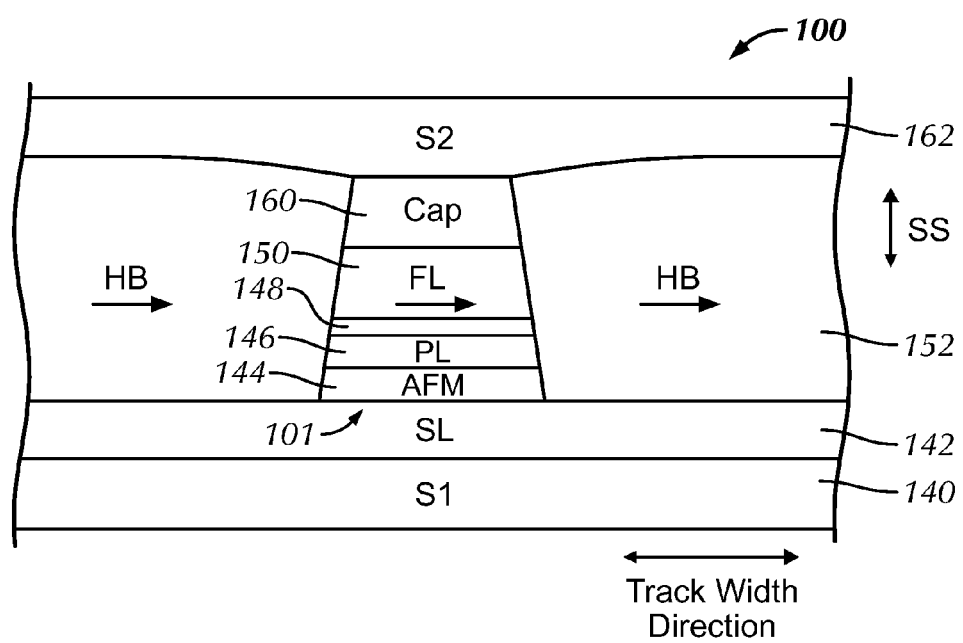
FIG. 2 is a sectional view of a portion of a magnetic recording read transducer, in an embodiment of the present invention, as can be used in a disk drive data storage system as in FIG. 1.

A suspension 28 is attached to the free end of each actuator arm 26 and cantilevers therefrom. The slider 30 is disposed at or near the free end of each suspension 28. What is commonly referred to as the read/write head (e.g., transducer) is mounted as a head unit 32 under the slider 30 and is used in disk drive read/write operations. As the suspension 28 moves, the slider 30 moves along arc path 34 and across the corresponding data storage disk 14 to position the head unit 32 at a selected position on the data storage disk 14 for the disk drive read/write operations. When the disk drive 10 is not in operation, the actuator arm assembly 24 may be pivoted to a parked position utilizing ramp assembly 42. The head unit 32 is connected to a preamplifier 36 via head wires routed along the actuator arm 26, which is interconnected with the control electronics 40 of the disk drive 10 by a flex cable 38 that is typically mounted on the actuator arm assembly 24. Signals are exchanged between the head unit 32 and its corresponding data storage disk 14 for disk drive read/write operations. A portion of the head unit 32 is shown in FIG. 2. The head unit 32 may utilize various types of read sensor technologies such as anisotropic magnetoresistive (AMR), giant magnetoresistive (GMR), tunneling magnetoresistive (TMR), other magnetoresistive technologies, or other suitable technologies.

FIG. 2 is an air-bearing surface (ABS) view of a portion of a magnetic recording read transducer, in an embodiment of the invention, as can be used with magnetic recording technology applications as in a disk drive data storage system as in FIG. 1. The illustrated read transducer 100 includes a tunneling magnetoresistive (TMR) sensor 101. The read transducer 100 may be part of a read head or alternatively may be part of a merged head that also includes a write transducer. Embodiments of the magnetoresistive sensor invention may also be utilized with an anisotropic magnetoresistive (AMR) sensor, giant magnetoresistive (GMR) sensor, or may be utilized with other magnetoresistive or suitable technologies.

TMR sensor 100 includes a patterned TMR structure or stack 101 having two ferromagnetic layers separated by an insulating barrier layer (e.g., MgO). One ferromagnetic layer is magnetically oriented in a fixed direction (the "pinned layer" PL 146) and the other ferromagnetic layer rotates in response to an external magnetic field (the "free layer" FL 150). The function layers of TMR stack 101 may include multiple layers. For example, the pinned layer 146 can be PL1/PL2, where PL1 is CoFe, and PL2 is CoB.

The TMR sensor 100 also typically includes a hard bias layer 152 disposed on either side of the TMR stack 101, providing a bias field along a direction perpendicular to layers of the TMR stack. Other technologies besides a hard bias layer may be employed with the present invention. The resistance of the device is dependent on the relative orientation between the two ferromagnetic layers 146 and 150. In a TMR read head, a sense current passes perpendicularly through layers of the TMR stack 101. The magnetic transitions between adjacent oppositely-directed magnetized regions cause changes in electrical resistance that are detected by the TMR sensor 100. The free layer 150 has a magnetization sensitive to an external magnetic field. The shields 140 and 162 may prevent some magnetic flux from reaching the sides of the free layer, to avoid influencing the ability of the free layer to accurately read data. A hard bias layer 152, or an alternative structure, including a soft bias structure, is situated for magnetically biasing the free layer 150 in the track width direction as indicated in FIG. 2. The TMR stack 101 also includes shields 140 and 162 (S1 and S2, respectively), seed layer 142 (SL), antiferromagnetic layer 144 (AFM), barrier 148 (e.g., MgO), and cap layer 160 (Cap).

In the example shown, cap layer 160 overlays free layer 150. Cap layer 160 includes one of titanium, hafnium, zirconium, niobium, tantalum, and ruthenium. In an example embodiment, the cap layer 160 includes titanium boride and is amorphous such that it has an effect on the free layer 150 to increase the magnetic moment, decrease the damping constant, and optimize magnetostriction of the free layer 150. The amorphous cap layer 160 may be situated to at least substantially inhibit the free layer 150 from crystallizing in an orientation other than a body center cube crystal structure with a 100 plane (bcc (100)). In an example embodiment, the cap layer 160 thickness is less than 20 angstroms. In an embodiment of the invention, the free layer 150 includes i.) CoFe, and ii.) at least one of CoB, CoB and Fe, and $Co_{1-x}Fe_xB_y$, wherein x is 0 to 0.4, or x is 0 to 0.9, and y is 0.1 to 0.25.

Figure 3:
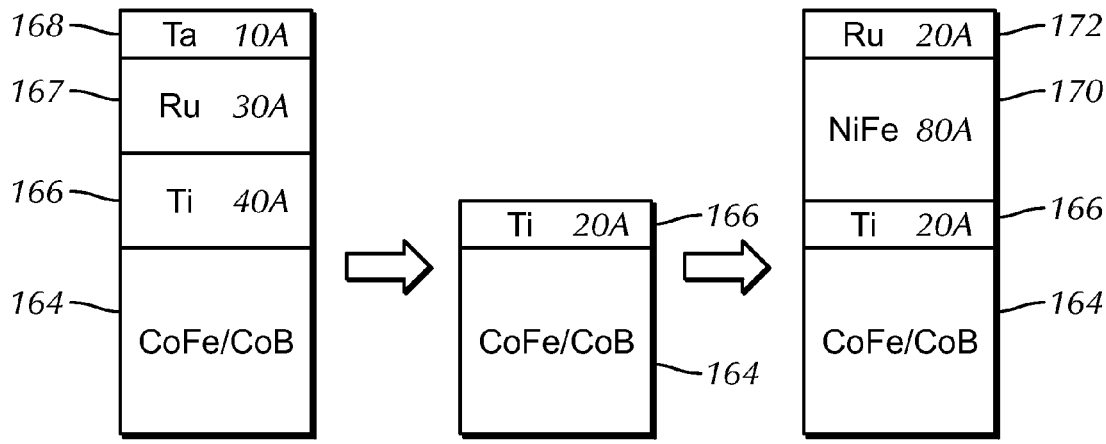
FIG. 3 is a sectional view representation illustrating a process of providing a free layer and a cap layer for a magnetoresistive sensor of a magnetic read transducer, as can be used in a disk drive data storage system as in FIG. 1, in an embodiment of the present invention.

Referring now to FIG. 3, a method or process is illustrated for providing a free layer and a cap layer for a magnetoresistive sensor of a magnetic read transducer, as can be used in a disk drive data storage system as in FIG. 1. The method employs an annealing step to the magnetoresistive sensor. Before annealing the manetoresistive sensor, the magnetoresistive sensor includes, in overlaying sequence, a CoFe and CoB free layer 164, a titanium cap layer 166, a ruthenium layer 167, and a tantalum layer 168. Alternatively, the cap layer 166 may include hafnium, zirconium, niobium, tantalum, or ruthenium. Cap layer 166 can act as a protection cap, and in an example, acts as a boron absorption layer. Also alternatively, the free layer 164 includes i.) CoFe, and ii.) at least one of CoB, CoB and Fe, and $Co_{1-x}Fe_xB_y$, wherein x is 0 to 0.4, or x is 0 to 0.9, and y is 0.1 to 0.25. The cap layer 166 is situated with a first thickness to absorb boron from the free layer 164 to the cap layer 166. In the example illustrated example, the titanium cap layer thickness is 40 Å. Alternatively, the first thickness (before annealing) of the cap layer 166 is in a range of 40 angstroms to 200 angstroms. In another alternative, the first thickness (before annealing) of the cap layer 166 is in a range of 5 angstroms to 200 angstroms. In an example embodiment, a thicker cap layer absorbs a greater amount of boron from the free layer 164 that includes CoB. The titanium cap layer 166, having low formation energy, absorbs boron from the free layer 164. In an embodiment, the desired thickness of cap layer 166 is related to factors including the materials utilized for the free layer and the cap layer, the sensor device, and the level of stress, to obtain a desired magnetostriction. Next, a ruthenium layer 167 is situated overlaying the cap layer 166, and a tantalum layer 168 is situated overlaying the ruthenium layer 167. In the illustrated example, the tantalum layer thickness is 10 Å, and the ruthenium layer thickness is 30 Å.

The magnetoresistive sensor is annealed, the cap layer 166 then absorbs boron from the free layer 164, and the cap layer 166 forms titanium boride. As the cap layer 166 forms titanium boride, the cap layer 166 becomes amorphous. The amorphous cap layer at least substantially inhibits the free layer from crystallizing in an orientation other than a body center cube crystal structure with a 100 plane (bcc (100)). A titanium cap layer also attracts oxygen, thereby reducing oxidation of other magnetoresistive sensor layers. Also, when boron is attracted out of the free layer 164, the free layer 164, after annealing, exhibits a higher magnetic moment, lower damping constant, and optimized magnetostriction. When the free layer 164 exhibits these properties, the signal-to-noise ratio (SNR) is also increased. These free layer and manetoresistive sensor properties are desirable for high density recording.

After annealing the manetoresistive sensor, the cap layer 166 is reduced to a second thickness. In the illustrated example, the cap layer thickness is reduced to 20 A. Reducing the cap layer thickness reduces the shield-to-shield (SS) distance, which is useful for high density recording. Alternatively, the cap layer 166 is reduced to less than 20 angstroms, and less than one-half of the first thickness. As another alternative, the cap layer 166 may be reduced to 5 to 50 angstroms. The thickness of the cap layer 166 may be reduced by etching the cap layer 166 via methods including ion-beam milling, plasma etching, and chemical wet etching. As illustrated, a portion of the cap layer 166 thickness is etched to a desired thickness, along with etching down the tantalum and ruthenium layers.

After reducing the thickness of the cap layer 166, a layer may be situated or deposited overlaying the cap layer 166. In the illustrated embodiment, the layer overlaying the cap layer 166 includes a nickel-iron layer 170 overlaying the cap layer 166, and a ruthenium layer 172 or a tantalum layer overlaying the nickel-iron layer 170 to inhibit the nickel-iron layer from oxidizing. In the illustrated example, the NiFe layer thickness is 80 A, and the Ru layer thickness is 20 A.

Figure 4:
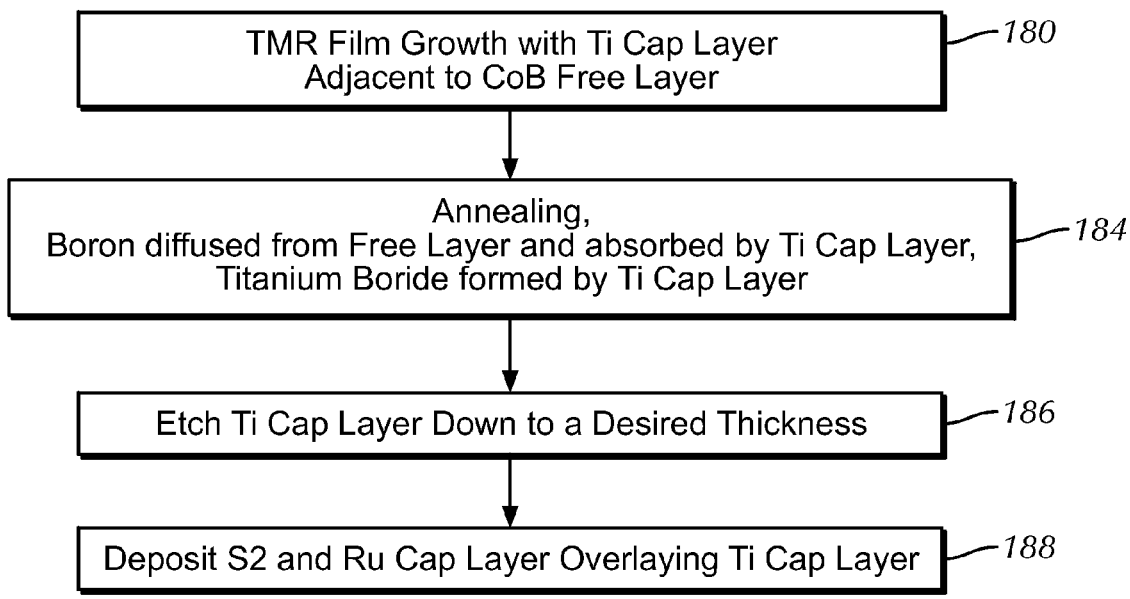
FIG. 4 is a flow diagram illustrating a process of providing a free layer and a cap layer for a magnetoresistive sensor of a magnetic read transducer, in an embodiment of the present invention.

Turning now to FIG. 4, a flow diagram illustrates an example process of providing a free layer and a cap layer for a magnetoresistive sensor of a magnetic read transducer. In this example process, a head unit, like the head unit 32 as in FIG. 1, employs a tunneling magnetoresistive (TMR) read sensor. The TMR film is grown, and a thick titanium cap layer is deposited adjacent to a free layer that includes CoB, as stated in step 180. A layer may also be deposited overlaying the titanium cap layer. An annealing step is performed to the magnetoresistive sensor, as stated in step 184. During annealing, boron is diffused from the free layer and absorbed by the thick titanium cap layer, the cap layer forming titanium boride, as further stated in step 184. After annealing, the free layer can exhibit better free layer performance, including a higher magnetic moment, lower damping constant, and optimized magnetostriction. Next, the layer overlaying the titanium cap layer is etched down, and the thick titanium cap layer is etched and reduced to a desired thickness, as stated in step 186. A shield and ruthenium layer is then deposited overlaying the cap layer, as stated in step 188.

Figure 6:
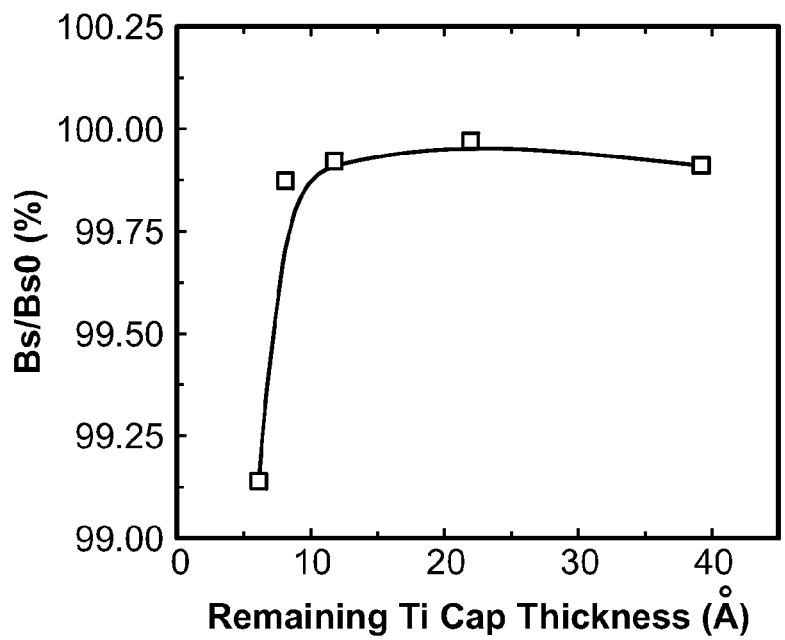
FIG. 6 is a representative graph illustrating experimental data of the effect that a titanium cap layer thickness has on the magnetic moment of a magnetoresistive sensor free layer, in an embodiment of the present invention.

Improved magnetic properties and performance of the free layer are maintained even with a reduced titanium cap layer thickness (as shown in FIG. 6), since the boron diffusion from the free layer to the cap layer forming titanium boride is accomplished before the reduction of the titanium cap layer thickness.

Figure 5:
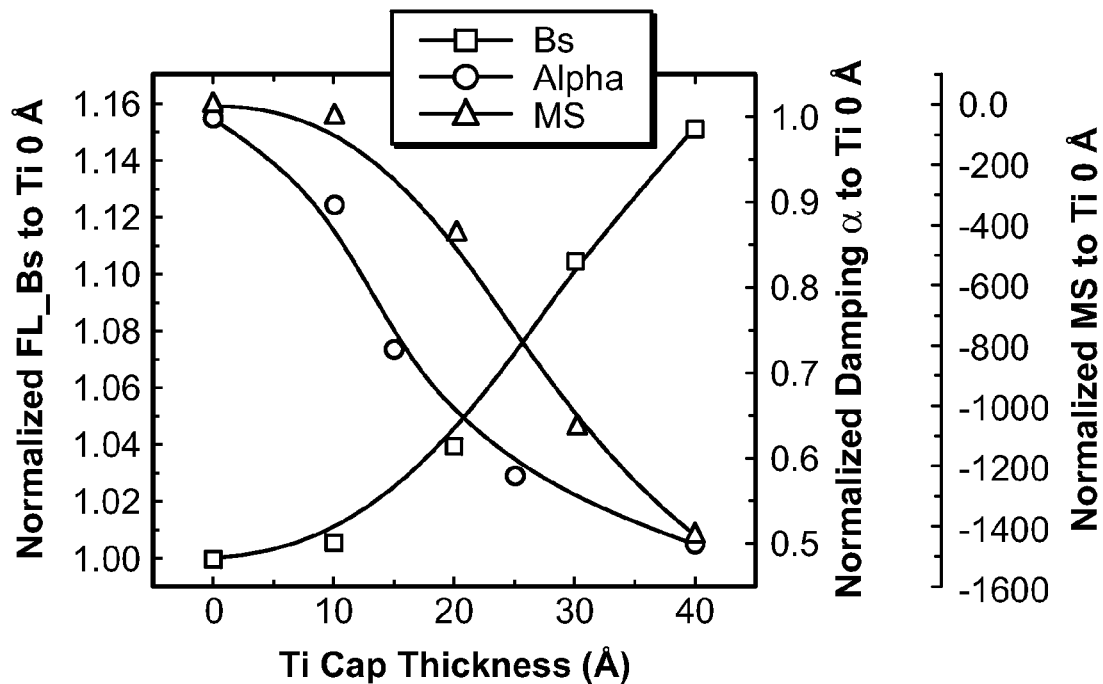
FIG. 5 is a representative graph illustrating experimental data of an effect that a titanium cap layer thickness has on the magnetic moment, damping constant, and magnetostriction of a magnetoresistive sensor free layer, in an embodiment of the present invention.

FIG. 5 is a representative graph illustrating experimental data of an effect that a titanium cap layer thickness has on the magnetic moment, damping constant, and magnetostriction of a magnetoresistive sensor free layer, in an embodiment of the present invention. The experimental data, using a mapping analysis, shows that, after annealing, a thicker overlaying Ti cap layer has an effect on a free layer including CoB, such that the free layer exhibits an increased magnetic moment (Bs), a lower damping constant ($\alpha$ or alpha), and increased negative magnetostriction (MS). The mapping analysis indicates that a thicker Ti cap can absorb more boron from the CoB free layer. The mapping analysis also shows that a 40 A Ti cap layer overlaying a free layer results in a free layer with half of a damping constant (0.004) as compared with a free layer without an overlaying Ti cap layer (0.008).

FIG. 6 is another representative graph illustrating experimental data of an effect that a titanium cap layer thickness has on the magnetic moment of a magnetoresistive sensor free layer, in an embodiment of the present invention. After annealing the magnetoresistive sensor, the Ti cap layer is etched to reduce its thickness. This experimental data shows no significant change in the magnetic moment of the magnetoresistive sensor free layer for various Ti cap layer thicknesses above about 10 A, after etching and reducing the Ti cap layer. The improved magnetic properties and performance of the free layer are thus retained, even when the Ti cap layer thickness is reduced to decrease the shield-to-shield distance (SS) of the magnetic read transducer for providing high areal density.

Modifications and variations may be made to the disclosed embodiments while remaining within the spirit and scope of the invention. The implementations described above and other implementations are within the scope of the following claims.

We claim:

1. A method for providing a magnetic read transducer including a magnetoresistive sensor, wherein the magnetoresistive sensor includes a cap layer overlaying a free layer, the method comprising:

situating the cap layer with a first thickness to absorb boron from the free layer to the cap layer; annealing the magnetoresistive sensor;

diffusing boron from the free layer and absorbing boron by the cap layer during the annealing the magnetoresistive sensor;

forming the cap layer as amorphous, the amorphous cap layer including titanium boride, and situating the amorphous cap layer to at least substantially inhibit the free layer from crystallizing in an orientation other than a body center cube crystal structure with a 100 plane (bcc (100)); and reducing the cap layer thickness to a second thickness, after annealing the magnetoresistive sensor.

2. The method as in claim 1, wherein the cap layer includes one of elemental titanium, hafnium, zirconium, niobium, tantalum, and ruthenium.

3. The method as in claim 1, wherein, before annealing the magnetoresistive sensor, the free layer includes i.) CoFe, and ii.) at least one of CoB, CoB and Fe, and $Co_{1-x}Fe_xB_y$, wherein x is 0 to 0.9, and y is 0.1 to 0.25.

4. The method as in claim 1, wherein the first thickness is in a range of 40 angstroms to 200 angstroms, and the second thickness is either 20 angstroms, or in a range of 5 angstroms to 50 angstroms.

5. The method as in claim 1, wherein reducing the cap layer thickness to the second thickness comprises reducing the cap layer thickness to less than 20 angstroms, and less than one-half of the first thickness.

6. The method as in claim 1, further comprising overlaying the cap layer with a ruthenium layer, and overlaying the ruthenium layer with a tantalum layer, before annealing the magnetoresistive sensor.

7. The method as in claim 1, further comprising overlaying the cap layer with a layer, after reducing the cap layer thickness to the second thickness.

8. The method as in claim 7, wherein the layer overlaying the cap layer includes a nickel-iron layer overlaying the cap layer, and a ruthenium layer or a tantalum layer overlaying the nickel-iron layer.

9. The method as in claim 1, wherein reducing the cap layer thickness comprises etching the cap layer via one of ion-beam milling, plasma etching, and chemical wet etching.

10. A method for providing a magnetic read transducer including a magnetoresistive sensor, wherein the magnetoresistive sensor includes a cap layer overlaying a free layer, the method comprising:
   forming the cap layer as amorphous, the amorphous cap layer including titanium boride; and situating the amorphous cap layer to at least substantially inhibit the free layer from crystallizing in an orientation other than a body center cube crystal structure with a 100 plane (bcc (100)).

11. The method as in claim 10, wherein the cap layer includes one of elemental titanium, hafnium, zirconium, niobium, tantalum, and ruthenium.

12. The method as in claim 10, wherein the free layer includes i.) CoFe, and ii.) at least one of CoB, CoB and Fe, and $Co_{1-x}Fe_xB_y$, wherein x is 0 to 0.9, and y is 0.1 to 0.25.

* * * * *